United States Patent
Chu

(10) Patent No.: US 7,917,775 B2
(45) Date of Patent: Mar. 29, 2011

(54) POWER SUPPLY SYSTEM

(75) Inventor: Shao-Kang Chu, Taipei (TW)

(73) Assignee: ASUSTeK COMPUTER Inc., Taipei (TW)

( * ) Notice: Subject to any disclaimer, the term of this patent is extended or adjusted under 35 U.S.C. 154(b) by 775 days.

(21) Appl. No.: 11/864,930

(22) Filed: Sep. 29, 2007

(65) Prior Publication Data

US 2008/0098249 A1    Apr. 24, 2008

(30) Foreign Application Priority Data

Oct. 18, 2006   (TW) ................................ 95138339 A

(51) Int. Cl.
G06F 1/26    (2006.01)
(52) U.S. Cl. ............. 713/300; 713/320; 307/43; 307/52
(58) Field of Classification Search ................... 713/300, 713/310, 320; 307/43, 52
See application file for complete search history.

(56) References Cited

U.S. PATENT DOCUMENTS

| | | | |
|---|---|---|---|
| 5,416,435 A * | 5/1995 | Jokinen et al. ................ 327/113 |
| 5,523,631 A * | 6/1996 | Fishman et al. ................ 307/38 |
| 5,774,813 A * | 6/1998 | Jokinen ........................ 455/574 |
| 5,870,573 A * | 2/1999 | Johnson ........................ 710/316 |
| 5,939,868 A * | 8/1999 | Hall et al. ..................... 323/281 |
| 6,191,499 B1 * | 2/2001 | Severson et al. ................ 307/31 |
| 6,496,881 B1 * | 12/2002 | Green et al. .................... 710/58 |
| 6,594,556 B1 * | 7/2003 | Agatstein et al. ............. 700/298 |
| 6,642,631 B1 * | 11/2003 | Clavette .......................... 307/52 |
| 7,254,159 B1 * | 8/2007 | Lavelle et al. ................ 375/141 |
| 7,293,181 B2 * | 11/2007 | Wierzbicki .................... 713/300 |
| 7,299,345 B2 * | 11/2007 | Van Cleve et al. ................ 713/2 |
| 7,526,674 B2 * | 4/2009 | Bailey et al. .................... 714/14 |
| 7,667,470 B2 * | 2/2010 | Audet et al. ................... 324/713 |
| 2004/0240244 A1 * | 12/2004 | Yamamoto .................... 363/131 |
| 2005/0046461 A1 * | 3/2005 | Huang et al. .................. 327/407 |
| 2006/0066288 A1 * | 3/2006 | Wheeler et al. ............... 323/282 |
| 2006/0069927 A1 * | 3/2006 | Wierzbicki .................... 713/300 |
| 2006/0284491 A1 * | 12/2006 | Kuo ............................... 307/116 |
| 2007/0174698 A1 * | 7/2007 | Bailey et al. .................... 714/22 |
| 2010/0001708 A1 * | 1/2010 | Dobkin .......................... 323/304 |
| 2010/0127650 A1 * | 5/2010 | Peterson .................. 318/400.26 |

FOREIGN PATENT DOCUMENTS

| | | |
|---|---|---|
| CN | 1282895 | 2/2001 |
| CN | 2562481 | 7/2003 |
| TW | 521190 | 2/2003 |
| TW | 534535 | 5/2003 |

OTHER PUBLICATIONS

"Office Action of Taiwan counterpart application", issued on Oct. 15, 2009, p. 1-p. 7.

* cited by examiner

*Primary Examiner* — Thomas Lee
*Assistant Examiner* — Zahid Choudhury
(74) *Attorney, Agent, or Firm* — Jianq Chyun IP Office

(57) ABSTRACT

A power supply system suitable for being located in a computer is provided. The system includes a first voltage regulator module (VRM), a second VRM, a first switch unit, and a second switch unit. The first VRM is used to supply a first power. The second VRM is used to supply a second power. The first switch unit is used for controlling the first power to be transmitted to a first central processing unit (CPU) socket by a first power supply path or to a second CPU socket by a second power supply path. The second switch unit is used for controlling the second power to be transmitted to the first CPU socket by the third power supply path or to the second CPU socket by the fourth power supply path.

12 Claims, 3 Drawing Sheets

POWER SUPPLY SYSTEM

CROSS-REFERENCE TO RELATED APPLICATION

This application claims the priority benefit of Taiwan application serial no. 95138339, filed Oct. 18, 2006. All disclosure of the Taiwan application is incorporated herein by reference.

BACKGROUND OF THE INVENTION

1. Field of the Invention

The invention relates to a power supply system and, more particularly, to a power supply system which can switch the power supply path of a central processing unit (CPU).

2. Description of the Related Art

With the development of science and technology, the central processing unit (CPU) of new generation does not emphasize on working frequency but on saving power and high efficiency. Therefore, CPU manufactures develop dual core processors to replace conventional single core processors. Meanwhile, multiple CPUs are also applied in personal computers.

Generally speaking, each CPU has a corresponding voltage regulator module (VRM) to supply power, wherein the VRM often includes a reference voltage generator (DAC), a pulse width controller, a core voltage driver, and so on. Moreover, the VRM is often disposed on the motherboard, and the VRM of a specific type can only be used with its corresponding CPU. For example, the VRM conforming to power standard of VRM 10.1 and the VRM conforming to power standard of VRM 11 can not be used to any CPU at will.

FIG. 1 is a diagram showing a conventional power supply for multiple CPUs. In FIG. 1, the power of the CPU 101 is supplied by the VRM 102, and the power of the CPU 103 is supplied by the VRM 104.

However, with the development of speed and functions of the CPU, the power needed by the CPU is also increasing, and when upgrading the CPU, the original power of the VRM may be inadequate. This results in the fact that consumers are forced to replace the motherboard when upgrading the CPU because the voltage regulator module (VRM) cannot supply adequate power.

For example, the maximum rated power needed by the CPUs 101 and 103 in FIG. 1 is 60 W respectively, and the VRMs 102 and 104 also can provide 60 W respectively. When upgrading the CPU 101 or the CPU 103, if the maximum rated power needed by the upgraded CPU is 80 W, then neither the VRM 102 nor the VRM 104 can provide the power, it is obvious that they are not adequate, at this time the consumer has to change the motherboard to upgrade the CPU. This doesn't conform to economic benefits, and further results in waste.

SUMMARY OF THE INVENTION

An objective of the invention is to provide a power supply system which can switch the power supply path of the central processing unit (CPU) according to practical need.

Another objective of the invention is to provide a power supply system which can provide adequate power when upgrading the computer.

Another objective of the invention is to provide a power supply system which can make a user need not to replace the motherboard when upgrading the CPU.

Another objective of the invention is to provide a power supply system which can conform to economic benefits and avoid waste when upgrading the computer.

Based on the above and other objectives, the invention provides a power supply system suitable for being located in a computer. The power supply system includes a first voltage regulator module (VRM), a second VRM, a first switch unit, and a second switch unit. The first VRM is to supply a first power, and the second VRM is to supply a second power.

The first switch unit is respectively coupled to the first VRM, the first CPU socket, and the second CPU socket, wherein a first power supply path exists between the first CPU socket and the first switch unit, and a second power supply path exists between the second CPU socket and the first switch unit. The second switch unit is respectively coupled to the second VRM, the first CPU socket, and the second CPU socket, wherein a third power supply path exists between the first CPU socket and the second switch unit, and a fourth power supply path exists between the second CPU socket and the second switch unit. The first VRM, the second VRM, the first CPU socket, and the second CPU socket are all disposed on the motherboard of the computer.

When the first CPU and the second CPU are inserted respectively in the first CPU socket and the second CPU socket, the first switch unit may control the first power to be transmitted to the first CPU by the first power supply path or to the second CPU by the second power supply path. When the first CPU and the second CPU are inserted respectively in the first CPU socket and the second CPU socket, the second switch unit may control the second power to be transmitted to the first CPU by the third power supply path or to the second CPU by the fourth power supply path.

Based on the above and other objectives, the invention is to provide a power supply system suitable for being located in the computer. The power supply system includes a first VRM, a second VRM, a first switch unit, a second switch unit, a third switch unit, and a fourth switch unit. The first VRM is to supply a first power, and the second VRM is to supply a second power.

The first switch unit is respectively coupled to the first VRM and a first CPU socket, wherein a first power supply path exists between the first CPU socket and the first switch unit. The second switch unit is respectively coupled to the first VRM and a second CPU socket, wherein a second power supply path exists between the second CPU socket and the second switch unit. The third switch unit is respectively coupled to the second VRM and the first CPU socket, wherein a third power supply path exists between the first CPU socket and the third switch unit. The fourth switch unit is respectively coupled to the second VRM and the second CPU socket, wherein a fourth power supply path exists between the second CPU socket and the fourth switch unit. The first VRM, the second VRM, the first CPU socket, and the second CPU socket are all disposed on the motherboard of the computer.

When the first CPU is inserted in the first CPU socket, the first switch unit may control the first power to be transmitted to the first CPU by the first power supply path and the third switch unit may control the second power to be transmitted to the first CPU by the third power supply path. When the second CPU is inserted in the second CPU socket, the second switch unit may control the first power to be transmitted to the first CPU by the first power supply path and the fourth switch may control the second power to be transmitted to the second CPU by the fourth power supply path.

The invention makes use of switch units to change the power supply path of the VRMs so that the power supply path can be changed according to practical need, therefore when upgrading the computer, the invention can provide more power and users needn't to replace the motherboard, further to confirm to economic benefits and avoid waste.

These and other features, aspects, and advantages of the present invention will become better understood with regard to the following description, appended claims, and accompanying drawings.

DETAILED DESCRIPTION OF THE EMBODIMENTS

Figure 1:
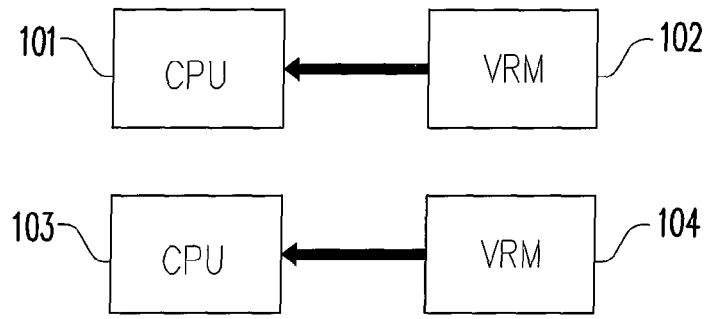
FIG. 1 is a diagram showing a conventional power supply for multiple central processing units (CPU).
Figure 2:
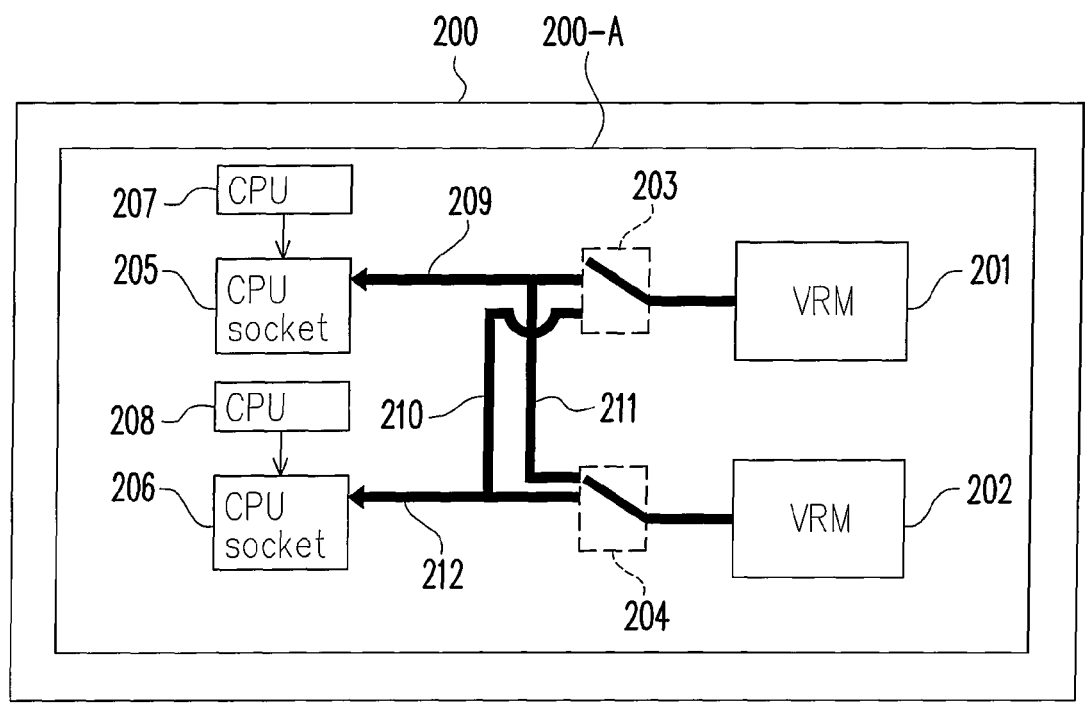
FIG. 2 is a diagram showing the power supply system according to an embodiment of the invention.

FIG. 2 is a diagram showing the power supply system according to an embodiment of the invention. In FIG. 2, the power supply system is provided on a motherboard 200-A in a computer 200. That is, the power supply system includes voltage regulator modules (VRMs) 201 and 202, switch units 203 and 204, and central processing unit (CPU) sockets 205 and 206. The VRMs 201, 202, the switch units 203, 204, and the CPU sockets 205, 206 are all disposed on the motherboard 200-A. Moreover, a CPU 207 can be inserted in the CPU socket 205 and a CPU 208 can be inserted in the CPU socket 206.

The switch unit 203 is respectively coupled to the VRM 201, the CPU socket 205, and the CPU socket 206, wherein there is a first power supply path 209 between the CPU socket 205 and the switch unit 203 and a second power supply path 210 between the CPU socket 206 and the switch unit 203.

The switch unit 204 is respectively coupled to the VRM 202, the CPU socket 206, and the CPU socket 205, wherein a third power supply path 211 exists between the CPU socket 205 and the switch unit 204, and a fourth power supply path 212 exists between the CPU socket 206 and the switch unit 204.

The VRM 201 is used to supply a first power, wherein the first power under a default state is supplied to enable the CPU 207 of the CPU socket 205 to work normally. In the embodiment, the VRM 201 also can supply the first power to the CPU 207 of the CPU socket 205 or to the CPU 208 of the CPU socket 206 by operating the switch unit 203. That is, when the switch unit 203 is switched to the first power supply path 209, the first power is supplied to the CPU 207; when the switch unit 203 is switched to the second power supply path 210, the first power is supplied to the CPU 208.

The VRM 202 is used to supply a second power, wherein the second power under a default state is supplied to enable the CPU 208 of the CPU socket 206 to work normally. Similarly, in the embodiment, the VRM 202 also can supply the second power to the CPU 208 of the CPU socket 206 or to the CPU 207 of the CPU socket 205 by operating the switch unit 204. That is, when the switch unit 204 is switched to the third power supply path 211, the second power can be supplied to the CPU 207; and when the switch unit 204 is switched to the fourth power supply path 212, the second power can be supplied to the CPU 208. How the switch units 203, 204 are controlled will be described after.

For example, if each of the CPUs 207 and 208 of FIG. 2 needs 60 W respectively, and the VRMs 201, 202 also can provide 60 W respectively. Therefore, under the preset state, the first power supplied by the VRM 201 is transmitted to the CPU 207 through the switch unit 203 and the first power supply path 209; the second power supplied by the VRM 202 is transmitted to the CPU 208 through the switch unit 204 and the fourth power supply path 212.

There is a case that users want to upgrade a CPU, such as to change the CPU 207 to an upgraded CPU, however, the maximum rated power needed by the upgraded CPU is 120 W, wherein the upgraded CPU is inserted in the CPU socket 205. In the embodiment, the switch units 203 and 204 may be controlled to make the first power supplied by the VRM 201 be transmitted to the upgraded CPU by the first power supply path 209 and to make the second power supplied by the VRM 202 be transmitted to the upgraded CPU by the third power supply path 211.

In this embodiment, the efficiency of the upgraded CPU may be higher than the CPUs 207 and 208. Therefore, only one upgraded CPU is provided on the motherboard 200-A, and the two VRMs 201 and 202 are used to supply power to the upgraded CPU.

Similarly, the upgraded CPU also can be inserted in the CPU socket 206. The switch units 203 and 204 can be controlled so that the first power supplied by the VRM 201 can be transmitted to the upgraded CPU by the second power supply path 210 and the second power supplied by the VRM 202 can be transmitted by the fourth power supply path 212.

Figure 3:
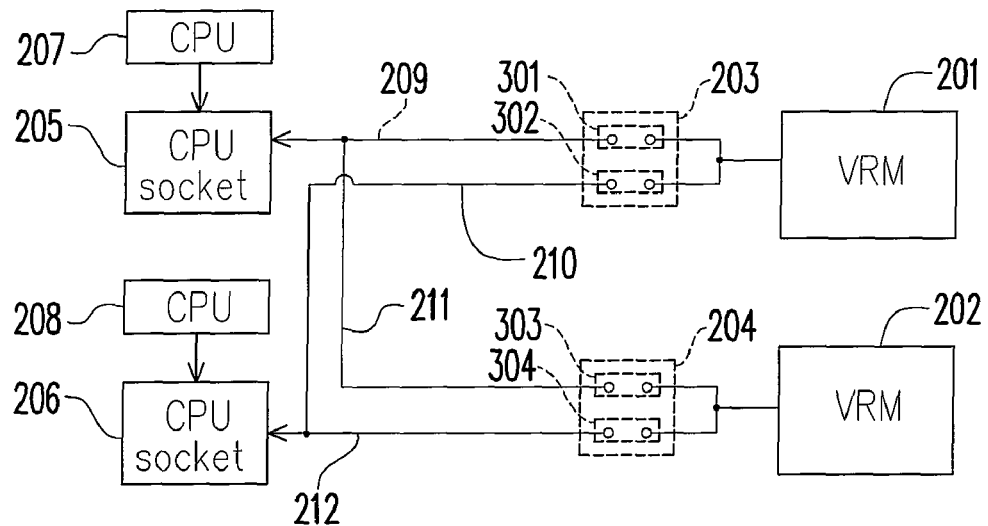
FIG. 3 is a diagram showing the embodiment in which the switch unit of FIG. 2 is carried out by a mechanism.

In the embodiment, the switch units 203 and 204 can be implemented in different ways. For example, the switch units 203 and 204 can be electronic or mechanical switches. FIG. 3 is a diagram showing the embodiment in which the switch unit in FIG. 2 is a mechanical switch. In FIG. 3, the switch unit 203 includes two joints 301 and 302, and the switch unit 204 includes two joints 303 and 304.

The joint 301 is respectively coupled to the VRM 201 and the first power supply path 209, the joint 302 is respectively coupled to the VRM 201 and the second power supply path 210, the joint 303 is respectively coupled to the VRM 202 and the third power supply path 211, and the joint 304 is respectively coupled to the VRM 202 and the fourth power supply path 212.

A connection card can be inserted in the above joints 301, 302, 303, and 304 to couple the two connection points of every joint. Therefore, to control the VRM 201 to supply the first power to the CPU 207, one just needs to insert a connection card in the joint 301. Similarly to control the VRM 202 to supply the second power to the CPU 207, it just needs to insert a connection card in the joint 303. In other embodiments, the connection card can be replaced by a jumper.

Figure 4:
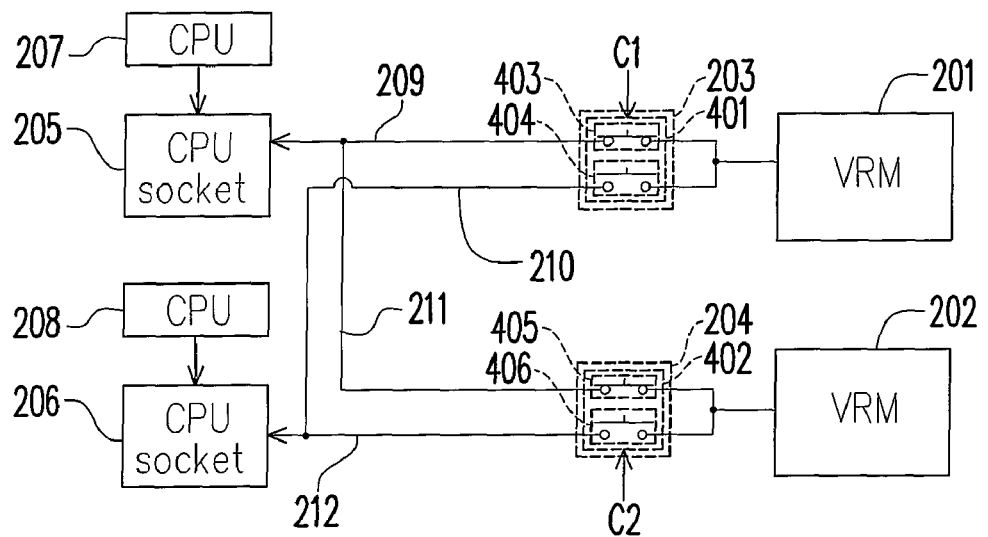
FIG. 4 is a diagram showing the embodiment in which the switch unit of FIG. 2 is accomplished by a mechanical relay.

FIG. 4 is a diagram showing the embodiment in which the switch unit in FIG. 2 is accomplished by a mechanical relay. In FIG. 4, the switch unit 203 and the switch unit 204 are accomplished respectively by a relay 401 and a relay 402.

The relay 401 includes a normally closed contact 403 and a normally open contact 404. The normally closed contact 403 is coupled between the VRM 201 and the first power supply path 209, and the normally open contact 404 is coupled between the VRM 201 and the second power supply path 210. The relay 401 is to determine whether to open the normally closed contact 403 or whether to close the normally open contact 404 according to a control signal C1.

The relay 402 includes a normally closed contact 405 and a normally open contact 406. The normally closed contact 405 is coupled between the VRM 202 and the third power supply path 211, and the normally open contact 406 is coupled between the VRM 202 and the fourth power supply path 212. The relay 402 is to determine whether to open the normally closed contact 405 or whether to close the normally open contact 406 according to a control signal C2.

Figure 5:
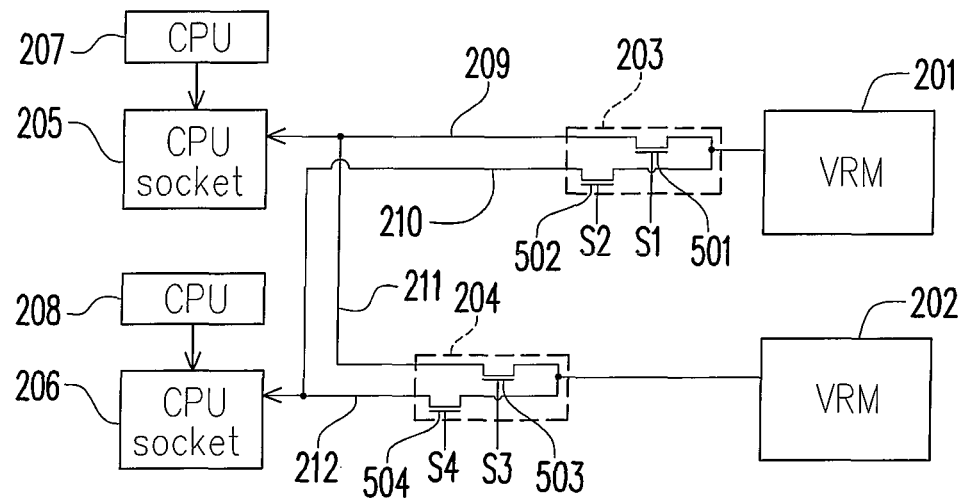
FIG. 5 is diagram showing the embodiment in which the switch unit of FIG. 2 is accomplished by a transistor circuit.

Moreover, in higher-level products, transistors are preferred to be used as the switch units. FIG. 5 is diagram showing the embodiment in which the switch unit in FIG. 2 is accomplished by a transistor circuit. In FIG. 5, the transistor circuit is accomplished by a MOSFET. For example, in the embodiment the switch unit 203 is accomplished by the transistor circuit consisting of transistors 501 and 502 and the switch unit 204 is accomplished by the transistor circuit consisting of transistors 504 and 505, and the control signals S1, S2, S3, and S4 are used to control the open/closed state of the transistor circuits. It is certain that the transistor circuits in practice may be more complex than in FIG. 5. In other embodiments, the transistor circuits can also be accomplished by BJTs. How to use transistor circuits as the switch circuits are well known to persons having ordinary skill in the art, and therefore the related descriptions are omitted here for concise purpose.

Although the above embodiments have described some practical aspects of the switch units, persons having ordinary skill in the art should know that based on the same concept of the invention practical aspects of the switch units will not be limited in the above embodiments.

There are two main ways to control the above switch units. The first way is to insert a connection card or a jumper manually to operate the switch units. The second way is to set some software to operate the switch units, wherein the switch units of this kind may be implemented by relays or transistor circuits. The setting the software may be implemented in the following way: when booting the computer, the user may enter the Basic Input/Output System (BIOS) to set the switch units. It is certain that the user also can control the switch units via an Application (AP) in the Operating System (OS).

According to the spirit shown in FIG. 2, to provide more flexibility to users, in other embodiments, more switch units can be used to switch the power supply paths.

Figure 6:
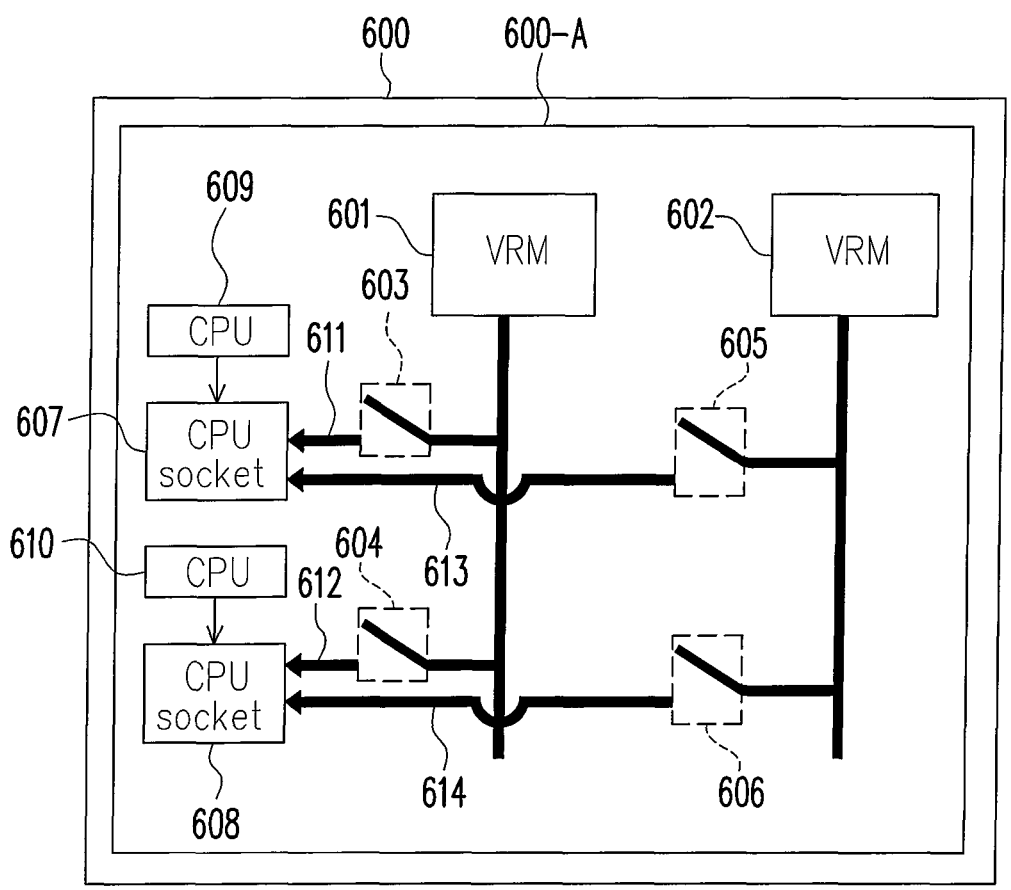
FIG. 6 is a diagram showing the power supply system according to another embodiment of the invention.

FIG. 6 is a diagram showing the power supply system according to another embodiment of the invention. In FIG. 6, the power supply system is provided on the motherboard 600-A of the computer 600. The power supply system includes VRMs 601 and 602, switch units 603, 604, 605 and 606, and CPU sockets 607 and 608. The VRMs 601 and 602, the switch units 603, 604, 605 and 606, and the CPU sockets 607 and 608 are all disposed on the motherboard 600-A. Moreover, a CPU 609 can be inserted in the CPU socket 607 and a CPU 610 can be inserted in the CPU socket 608.

The switch unit 603 is respectively coupled to the VRM 601 and the CPU socket 607, wherein a first power supply path 611 exists between the CPU socket 607 and the switch unit 603.

The switch unit 604 is respectively coupled to the VRM 601 and the CPU socket 608, wherein a second power supply path 612 exists between the CPU socket 608 and the switch unit 604.

The switch unit 605 is respectively coupled to the VRM 602 and the CPU socket 607, wherein a third power supply path 613 exists between the CPU socket 607 and the switch unit 605.

The switch unit 606 is respectively coupled to the VRM 602 and the CPU socket 608, wherein a fourth power supply path 614 exists between the CPU socket 608 and the switch unit 606.

In the embodiment, the movement and function of the elements mentioned above are similar to the elements in FIG. 2. The details are omitted here for concise purpose.

In the embodiment, the switch unit 603 can control the first power to be transmitted to the CPU 609 of the CPU socket 607 by the first power supply path 611. The switch unit 604 can control the first power to be transmitted to the CPU 610 of the CPU socket 608 by the power supply path 612. The switch unit 605 can control the second power to be transmitted to the CPU 609 of the CPU socket 607 by the third power supply path 613. The switch unit 606 can control the second power to be transmitted to the CPU 610 of the CPU socket 608 by the fourth power supply path 614.

For example, each of the CPUs 609 and 610 of FIG. 6 needs 50 W respectively, and the VRMs 601 and 602 can provide 60 W respectively. Therefore, under a default state, the first power supplied by the VRM 601 is transmitted to the CPU 609 by the switch unit 603 and the first power supply path 611; the second power supplied by the VRM 602 is transmitted to the CPU 610 by the switch unit 606 and the fourth power supply path 614.

There is a case that users want to upgrade a CPU, such as to change the CPU 609 into an upgraded CPU, however, the maximum rated power needed by the upgraded CPU is 70 W, wherein the upgraded CPU is inserted in the CPU socket 607. In the embodiment, the switch units 603 and 605 may be controlled to make the first power supplied by the VRM 601 be transmitted to the upgraded CPU by the first power supply path 611 and to make the second power supplied by the VRM 602 be transmitted to the upgraded CPU by the third power supply path 613.

It is certain that, in the example, the efficiency of the upgraded CPU may be higher than the CPUs 609 and 610. Therefore, now only one upgraded CPU exists on the motherboard 600-A and the two VRMs 601 and 602 supply power to the upgraded CPU.

Users also can use an upgraded CPU and an older CPU to arrange multiple CPUs to increase the efficiency of the system. For example, the CPU 609 can be changed into an advanced CPU with a maximum rated power of 70 W, while the CPU 610 is the older CPU with a the maximum rated power of 50 W.

Therefore, by controlling the switch units 603, 605 and 606, the first power supplied by the VRM 601 can be transmitted to the upgraded CPU by the first power path 611, the second power supplied by the VRM 602 can be transmitted to the upgraded CPU by the second power path 613, part of the second power supplied by the VRM 602 can be transmitted to the old CPU by the fourth power supply path 614, wherein by switching the switch units 605 and 606 the VRM 602 can provide 10 W of the second power to the upgraded CPU and 50 W of the second power to the old CPU. In other embodiments, the upgraded CPU and the old CPU can be made parallel by switching the switch units 603, 605 and 606, and the first power and the second power supplied by the VRMs 601, 602 are consumed by the upgraded CPU and the old CPU.

As to the switch units shown in FIG. 6, they also can be implemented by mechanisms, relays, or transistor circuits, and how to implement may be derived easily by persons having ordinary skill in the art, therefore related descriptions are omitted here.

Although the above embodiments have described some practical modes of the switch units, persons having ordinary skill in the art should know that if only using the switch units to change the power supply paths of the VRMs and the power supply paths are changed according to the practical need, the spirit of the invention is conformed. And based on the embodiments, persons having ordinary skill in the art should know that the invention also can be applied in the situation when there are more than two loads.

To sum up, the embodiment of the invention makes use of switch units to change the power supply path of the VRMs so that the power supply path can be changed according to practice, therefore when upgrading a computer, the invention can provide more power and users don't need to abandon the motherboard, further to confirm to economic benefits and avoid waste.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A power supply system, which is suitable for being located in a computer, comprising:
   a first voltage regulator module (VRM) for supplying a first power;
   a second VRM for supplying a second power;
   a first switch unit respectively coupled to the first VRM, a first central processing unit (CPU) socket, and a second CPU socket, wherein a first power supply path exists between the first CPU socket and the first switch unit, and a second power supply path exists between the second CPU socket and the first switch unit; and
   a second switch unit respectively coupled to the second VRM, the first CPU socket, and the second CPU socket, wherein a third power supply path exists between the first CPU socket and the second switch unit, and a fourth power supply path exists between the second CPU socket and the second switch unit,
   wherein the first VRM, the second VRM, the first CPU socket, and the second CPU socket are all disposed on a motherboard of the computer, and the first VRM and the second VRM supply the first power and the second power to the first CPU socket or the second CPU socket simultaneously.

2. The power supply system according to claim 1, wherein the first switch unit and the second switch unit respectively include a transistor circuit, a relay, or a mechanism.

3. The power supply system according to claim 1, wherein the first switch unit and the second switch unit are disposed on the motherboard.

4. The power supply system according to claim 1, wherein when a first CPU and a second CPU are inserted respectively in the first CPU socket and the second CPU socket, the first switch unit controls the first power to be transmitted to the first CPU by the first power supply path or to the second CPU by the second power supply path.

5. The power supply system according to claim 1, wherein when a first CPU and a second CPU are inserted respectively in the first CPU socket and the second CPU socket, the second switch unit controls the second power to be transmitted to the first CPU by the third power supply path or to the second CPU by the fourth power supply path.

6. A power supply system, which is suitable for being located in a computer, comprising:
   a first VRM for supplying a first power;
   a second VRM for supplying a second power;
   a first switch unit respectively coupled to the first VRM and a first CPU socket, wherein a first power supply path exists between the first CPU socket and the first switch unit;
   a second switch unit respectively coupled to the first VRM and a second CPU socket, wherein a second power supply path exists between the second CPU socket and the second switch unit;
   a third switch unit respectively coupled to the second VRM and the first CPU socket, wherein a third power supply path exists between the first CPU socket and the third switch unit; and
   a fourth switch unit respectively coupled to the second VRM and the second CPU socket, wherein a fourth power supply path exists between the second CPU socket and the fourth switch unit,
   wherein the first VRM, the second VRM, the first CPU socket, and the second CPU socket are all disposed on a motherboard of the computer, and the first VRM and the second VRM supply the first power and the second power to the first CPU socket or the second CPU socket simultaneously.

7. The power supply system according to claim 6, wherein the first switch unit, the second switch unit, the third switch unit, and the fourth switch unit respectively include a transistor circuit, a relay, or a mechanism.

8. The power supply system according to claim 6, wherein the first switch unit, the second switch unit, the third switch unit, and the fourth switch unit are disposed on the motherboard.

9. The power supply system according to claim 6, wherein when a first CPU is inserted in the first CPU socket, the first switch unit controls the first power to be transmitted to the first CPU by the first power supply path.

10. The power supply system according to claim 6, wherein when a second CPU is inserted in the second CPU socket, the second switch unit controls the first power to be transmitted to the second CPU by the second power supply path.

11. The power supply system according to claim 6, wherein when a first CPU is inserted in the first CPU socket, the third switch unit controls the second power to be transmitted to the first CPU by the third power supply path.

12. The power supply system according to claim 6, wherein when a second CPU is inserted in the second CPU socket, the fourth switch unit controls the second power to be transmitted to the second CPU by the fourth power supply path.

* * * * *